(12) United States Patent
Badre-Alam et al.

(10) Patent No.: US 9,404,549 B2
(45) Date of Patent: Aug. 2, 2016

(54) ELECTROMAGNETIC INERTIAL ACTUATOR

(75) Inventors: Askari Badre-Alam, Cary, NC (US); Michael D. Janowski, Clayton, NC (US); Michael W. Trull, Apex, NC (US)

(73) Assignee: LORD Corporation, Cary, NC (US)

( * ) Notice: Subject to any disclaimer, the term of this patent is extended or adjusted under 35 U.S.C. 154(b) by 1318 days.

(21) Appl. No.: 12/774,184

(22) Filed: May 5, 2010

(65) Prior Publication Data

US 2011/0033310 A1    Feb. 10, 2011

Related U.S. Application Data

(63) Continuation-in-part of application No. PCT/US2009/063193, filed on Nov. 4, 2009.

(60) Provisional application No. 61/111,280, filed on Nov. 4, 2008.

(51) Int. Cl.
| | |
|---|---|
| *F16F 7/10* | (2006.01) |
| *F16F 15/03* | (2006.01) |
| *F16F 7/104* | (2006.01) |
| *F16F 1/18* | (2006.01) |
| *F16F 1/20* | (2006.01) |
| *F16F 3/12* | (2006.01) |

(52) U.S. Cl.
CPC ............... *F16F 7/104* (2013.01); *F16F 1/185* (2013.01); *F16F 1/20* (2013.01); *F16F 3/12* (2013.01); *F16F 7/1011* (2013.01); *F16F 15/03* (2013.01); *Y10T 29/49609* (2015.01)

(58) Field of Classification Search
CPC ........................................................ F16F 15/03
USPC ............... 310/36, 51; 188/378; 248/550, 638
See application file for complete search history.

(56) References Cited

U.S. PATENT DOCUMENTS

| | | | |
|---|---|---|---|
| 2,439,219 | A | 4/1948 | O'Connor |
| 3,649,000 | A | 3/1972 | Desy |
| 3,782,854 | A | 1/1974 | Rybicki |
| 3,984,706 | A * | 10/1976 | Inouye ...................... 310/12.08 |
| 4,227,857 | A | 10/1980 | Reyes |
| 5,333,819 | A * | 8/1994 | Stetson, Jr. .................... 244/164 |
| 5,492,313 | A | 2/1996 | Pan et al. |
| 5,695,027 | A * | 12/1997 | von Flotow et al. .......... 188/380 |
| 5,896,076 | A | 4/1999 | van Namen |
| 5,975,510 | A * | 11/1999 | Miyazaki ................. 267/140.15 |

(Continued)

FOREIGN PATENT DOCUMENTS

| | | |
|---|---|---|
| DE | 19741627 A1 | 3/1999 |
| DE | 19823716 A1 | 12/1999 |

(Continued)

OTHER PUBLICATIONS

Graphitestore.Com, Carbon Fiber Rod, Rectangular, Nov. 13, 2009, http://www.graphitestore.com/itemDetails.asp?search_string=carbon+fiber+rod%2C+rectangular&search_mode=1&item_id=1126&curPage=1,3 pages.

(Continued)

*Primary Examiner* — Burton Mullins
(74) *Attorney, Agent, or Firm* — Richard G. Miller

(57) ABSTRACT

An electromagnetic inertial actuator includes a support base and a parallel arrangement of a first flexure part, a voice coil motor part, and a second flexure part. The parallel arrangement is cantilevered from the support base.

8 Claims, 14 Drawing Sheets

(56) References Cited

U.S. PATENT DOCUMENTS

| | | | |
|---|---|---|---|
| 6,006,875 A | 12/1999 | van Namen | |
| 6,129,177 A | 10/2000 | Gwinn | |
| 6,279,679 B1 | 8/2001 | Thomasen | |
| 6,279,704 B1 * | 8/2001 | Manfredotti | 188/378 |
| 6,286,782 B1 | 9/2001 | Bansemir et al. | |
| 6,394,242 B1 * | 5/2002 | Allaei | 188/378 |
| 6,512,435 B2 | 1/2003 | van Namen | |
| 6,639,496 B1 | 10/2003 | van Namen | |
| 7,288,861 B1 * | 10/2007 | Willard et al. | 310/15 |
| 7,370,829 B2 | 5/2008 | Badre-Alam et al. | |
| 7,449,803 B2 | 11/2008 | Sahyoun | |
| 7,550,880 B1 * | 6/2009 | Pusl | 310/15 |
| 7,692,345 B2 | 4/2010 | Kayama et al. | |
| 8,129,870 B1 * | 3/2012 | Pusl | 310/15 |
| 2003/0173725 A1 | 9/2003 | Noe | |
| 2006/0054738 A1 | 3/2006 | Badre-Alam | |
| 2006/0208600 A1 | 9/2006 | Sahyoun | |
| 2006/0250036 A1 | 11/2006 | Kayama et al. | |
| 2008/0315725 A1 * | 12/2008 | Konstanzer et al. | 310/338 |
| 2009/0007560 A1 | 1/2009 | Inoshiri | |

FOREIGN PATENT DOCUMENTS

| | | |
|---|---|---|
| EP | 1659676 A1 | 5/2006 |
| EP | 1780440 A1 | 5/2007 |
| FR | 2825769 A1 | 12/2002 |
| GB | 2344148 A | 5/2000 |
| JP | 04136538 | 5/1992 |
| JP | 04136538 A | 5/1992 |
| JP | 08233028 A | 9/1996 |
| JP | H08247217 | 9/1996 |
| JP | 2006046419 | 2/2006 |
| JP | 2006207749 | 8/2006 |
| WO | WO2004/003403 A1 | 1/2004 |
| WO | WO/2010/053933 A1 | 5/2010 |

OTHER PUBLICATIONS

Supermagnetman.net, Rectangle Magnet, Mar. 14, 2011, http://www.supermagnetman.net/product_info.php?cPath=39&products_id=373.
Peter Konstanzer, Peter Janker, and Stefan Storm, A Piezo Inertial Force Generator Optimized for High Force and Low Frequency, Smart Material and Structures, 16 (2007), 1260-1264, IOP Publishing Ltd, UK, 5 pages.
The Composites Store, Inc., Carbon Rectangles and Strips, 2 pages.
The Composites Store, Inc., Carbon Rectangles and Strips, Carbon Rectangles, 7 pages.
Lord Corporation, Recent Advancement in Elastomeric Products for Improving Helicopter Reliability and Maintainability, 1979, 24 pages.
GMI Composites, Composite Springs, Sep. 3, 2009, www.gmicomposites.com/composite_springs.php, 1 page.
Advanced Motion Controls, DigiFlex Performance Servo Drive, DZRALTE-020L080, Feb. 2, 2011, 8 pages.
Chinese Patent Office, First Office Action for related Chinese Application No. CN201080055529.3 dated Feb. 8, 2014.
USPTO, Non-Final Rejection for related U.S. Appl. No. 13/127,559 dated Jan. 1, 2014.
PCT International Searching Authority, International Search Report and the Written Opinion of the International Searching Authority, or the Declaration for related International Application No. PCT/US2009/063193, dated Mar. 25, 2010.
PCT International Searching Authority, International Search Report and the Written Opinion of the International Searching Authority, or the Declaration for related International Application No. PCT/US2010/033726, dated Dec. 20, 2010.
European Patent Office, Communication pursuant to Article 94(3) EPC for related EP Application No. 10 726 355.0-1508 dated Feb. 28, 2013.
Lord Corporation, International Search Report and Written Opinion, Mailing Date: Mar. 25, 2010, International Application No. PCT/US2009/063193, 14 pages.

* cited by examiner

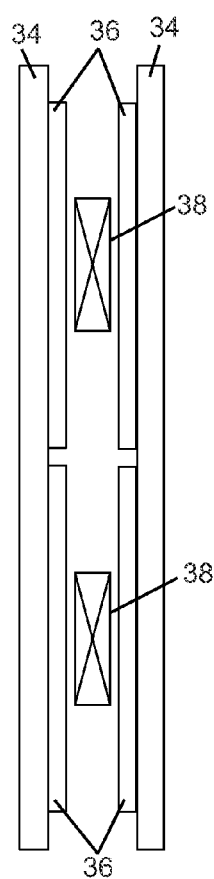 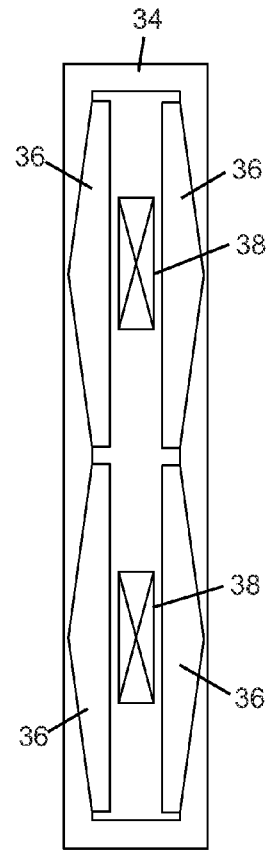 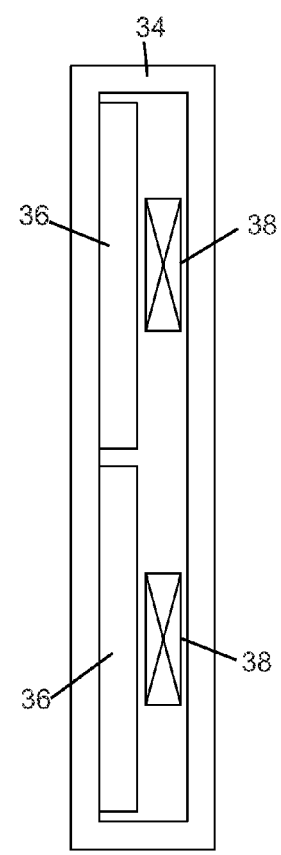
FIG. 11L    FIG. 11M    FIG. 11N
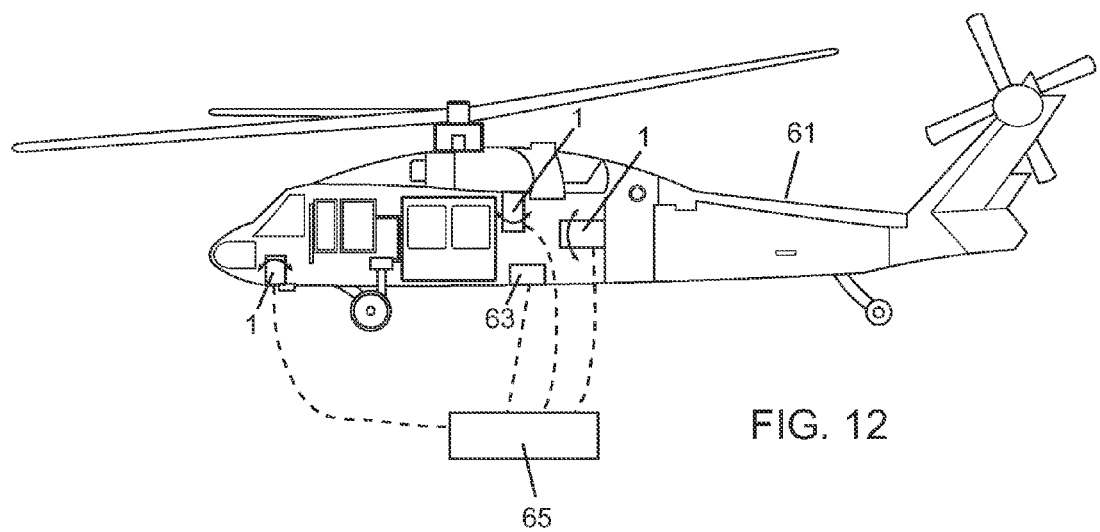
FIG. 12

ELECTROMAGNETIC INERTIAL ACTUATOR

CROSS-REFERENCE TO RELATED APPLICATIONS

This application is a continuation-in-part of PCT International Application Ser. No. PCT/US2009/063193, filed Nov. 4, 2009, which claims priority to U.S. Provisional Patent Application Ser. No. 61/111,280, filed Nov. 4, 2008 which the priority is herein claimed, both claimed applications are herein incorporated by reference.

FIELD

The present invention relates generally to active vibration control devices and more specifically to inertial actuators.

BACKGROUND

Inertial actuators are used to actively control vibrations of a structure, e.g., an aircraft fuselage. An inertial actuator is attached to the structure whose vibrations are to be controlled and operated to impart a force on the structure that counteracts the vibrations of the structure. Sensors may be attached to the structure to measure vibrations of the structure. The output of the sensors may be used to control the inertial actuator to generate the force required to counteract the vibrations of the structure. Inertial actuators are based on the principle that accelerating a suspended mass results in a reaction force on the supporting structure. An inertial actuator includes a mass that is connected to a rigid supporting structure by means of a compliant spring. Force is applied to the mass to accelerate the mass and thereby produce the reaction force on the supporting structure. The inertial actuator behaves as a force generator for frequencies above its suspension frequency. Typical inertial actuators are electromagnetic, electrodynamic, or piezoelectric actuators. The present invention relates to electromagnetic inertial actuators.

U.S. Pat. No. 7,288,861 (the '861 patent) discloses an electromagnetic inertial actuator for active vibration control that uses a cylindrical voice coil motor. In the '861 patent, a moving armature is suspended above a base by an array of flexure stacks. The array of flexure stacks is coupled at its center to the moving armature and at its ends to the top ends of vertical support flexures. The lower ends of the vertical support flexures are fastened to the base. The moving armature includes a tubular shell sleeve coaxially surrounding a cylindrical core, which is made of two permanent magnets and corresponding pole plates. A soft iron shell yoke plate attached to one of the magnets and the top end of the tubular shell sleeve magnetically and mechanically links the cylindrical core to the tubular shell sleeve. The two permanent magnets provide two magnetically-charged annular gaps between the pole plates and the inner wall of the tubular shell sleeve. Two voice coils, mounted on the base, are centered in the annular gaps. When the coils are energized, the windings in the coils interact with the magnetic flux in the annular gaps to vibrate the moving armature in a vertical direction as enabled by flexing of the flexure stacks and vertical support flexures.

U.S. Pat. No. 7,550,880 (the '880 patent) discloses a folded flexure system for cylindrical voice coil motors. The folded flexure system may be implemented in one or more tiers, with each tier of the folded flexure system comprising two or more triad array members. Quad array members are also disclosed. Each triad array member includes three compliant span elements—the two outer span elements are half-width while the central span element is full width. In one disclosed embodiment, the outer span elements are attached to the armature shell of a voice coil motor at one end and to a yoke/idler fastening at another end. The central span element is attached to a pedestal of the base at one end and to a yoke/idler fastening at another end. A permanent magnet within the armature shell sets up a magnetically charged annular gap between its circular pole piece and the inner wall of the armature shell. A coil/bobbin assembly attached to the base supports a coil in the annular magnetically charged gap. As in the '861 patent, when the coil is energized, the windings in the coil interact with the magnetic flux in the air gap to exert force that drives the armature mass along a vertical stroke axis. The vertical motion of the armature mass is enabled by symmetrical flexing of the folded flexure system.

SUMMARY

In a first aspect of the invention, an electromagnetic inertial actuator includes a support part and a parallel arrangement of a first flexure part, a voice coil motor part, and a second flexure part, where the parallel arrangement is cantilevered from the support part.

In a second aspect of the invention, an aircraft has an aircraft structure and a plurality of troublesome vibrations. The aircraft includes an electromagnetic inertial actuator support part, which is physically grounded to the aircraft structure. The aircraft further includes an electromagnetic inertial actuator parallel arrangement of a first flexure part, a voice coil motor part, and a second flexure part, where the electromagnetic inertial actuator parallel arrangement is cantilevered from the electromagnetic inertial actuator support part.

In a third aspect of the invention, a method for controlling troublesome aircraft vibrations of an aircraft includes providing an electromagnetic inertial actuator, which includes a support part and a parallel arrangement of a first flexure part, a voice coil motor part, and a second flexure part, where the parallel arrangement is cantilevered from the support. The method further includes physically grounding the support part to an aircraft structure of the aircraft and electromagnetically driving the electromagnetic inertial actuator, wherein the parallel arrangement traces an arc relative to the support part.

In an embodiment the invention includes a method of making an electromagnetic actuator including providing a base, providing a coil, grounding the coil with the base, providing a parallel arrangement of flexures and a voice coil motor, and cantilevering the parallel arrangement from the base.

These aspects and certain embodiments of the present invention will be described in more detail below.

BRIEF DESCRIPTION OF DRAWINGS

The following is a description of the figures in the accompanying drawings. The figures are not necessarily to scale, and certain features and certain views of the figures may be shown exaggerated in scale or in schematic in the interest of clarity and conciseness.

FIG. 12 shows an aircraft including a vibration control system.

DETAILED DESCRIPTION

Figure 1:
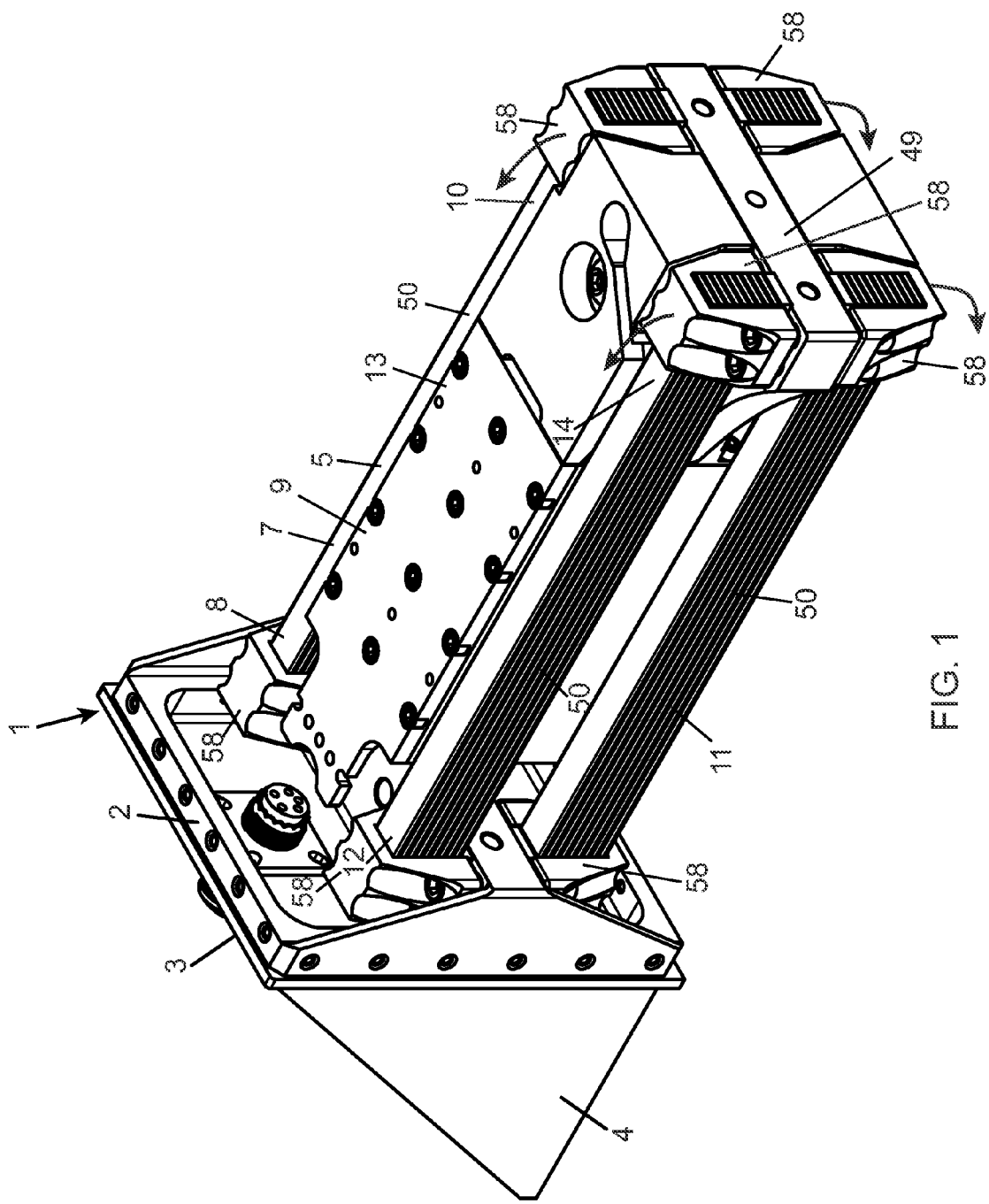
FIG. 1 is a perspective view of an electromagnetic inertial actuator.

In the following detailed description, numerous specific details may be set forth in order to provide a thorough understanding of embodiments of the invention. However, it will be clear to one skilled in the art when embodiments of the invention may be practiced without some or all of these specific details. In other instances, well-known features or processes may not be described in detail so as not to unnecessarily obscure the invention. In addition, like or identical reference numerals may be used to identify common or similar elements.

FIG. 1 shows an electromagnetic inertial actuator 1 according to one aspect of the present invention. The electromagnetic inertial actuator 1 includes a support base 3, which has an attachment plate 2 and mounting base 4. The attachment plate 2 may be integrally formed or otherwise attached to the mounting base 4. The bottom of the mounting base 4 can be attached to a structure, such as an aircraft structure, e.g., by bolts or other suitable attachment means. The electromagnetic inertial actuator 1 also includes a parallel arrangement 5 of a first flexure part 7, a voice coil motor part 9, and a second flexure part 11. A "voice coil motor" is a positioning device that uses a coil of wire in a permanent magnetic field. In the parallel arrangement 5, the first flexure part 7 is spaced apart from the second flexure part 11, and the voice coil motor part 9 is disposed in the space between the flexure parts 7, 11. The parallel arrangement 5 is cantilevered from the support base 3, i.e., the flexure parts 7, 11 and the voice coil motor part 9 extend outward from the support base 3 in the manner of a cantilever. The ends 8, 12 of the flexure parts 7, 11, respectively, which are coupled to the support base 3, are the fixed or supported ends of the flexure parts 7, 11. The ends 10, 14 of the flexure parts 7, 11, respectively, which are unattached to the support base 3, are the moving or unsupported ends of the flexure parts 7, 11. The unsupported ends 10, 14 of the flexure parts 7, 11, respectively, are coupled to a magnet part 13 of the voice coil motor part 9. In addition to the magnet part 13, the voice coil motor 9 also includes an interacting driving coil part (15 in FIGS. 2, 3). The interacting driving coil part (15 in FIGS. 2, 3) is preferably physically grounded to the support base 3, with the interacting driving coil part (15 in FIGS. 2, 3) being physically separated from the magnet part 13 and its associated cantilevered flexure-supported members, preferably with an air space gap. In the spring-mass actuator system, the cantilevered flexure-supported magnet part 13 and its associated cantilevered flexure-supported moving mass members represent a sprung moving mass, and the flexure parts 7, 11 represent a spring. The magnet part 13 creates a magnetic field. When alternating current is supplied to the physically grounded non-sprung, non-moving coil part 15, the coil part 15 interacts with the magnetic field created by the sprung moving mass magnet part 13 to generate an electromagnetic driving force that vibrates the cantilevered flexure-supported sprung moving mass magnet part 13. The sprung moving mass magnet part 13 moves in an arc as it is electromagnetically driven (i.e., moves up and down along a vertical direction in relation to the support base 3 (and the grounded coil 15) and in and out relative to the support base 3 at the same time to trace an arc). If the frequency of the alternating current supplied to the coil part (15 in FIGS. 2, 3) is the same as the natural frequency of the spring-mass system, the excursions of the magnet part 13 can become quite large. The larger the excursions, the higher the output force of the electromagnetic inertial actuator 1.

Figure 2:
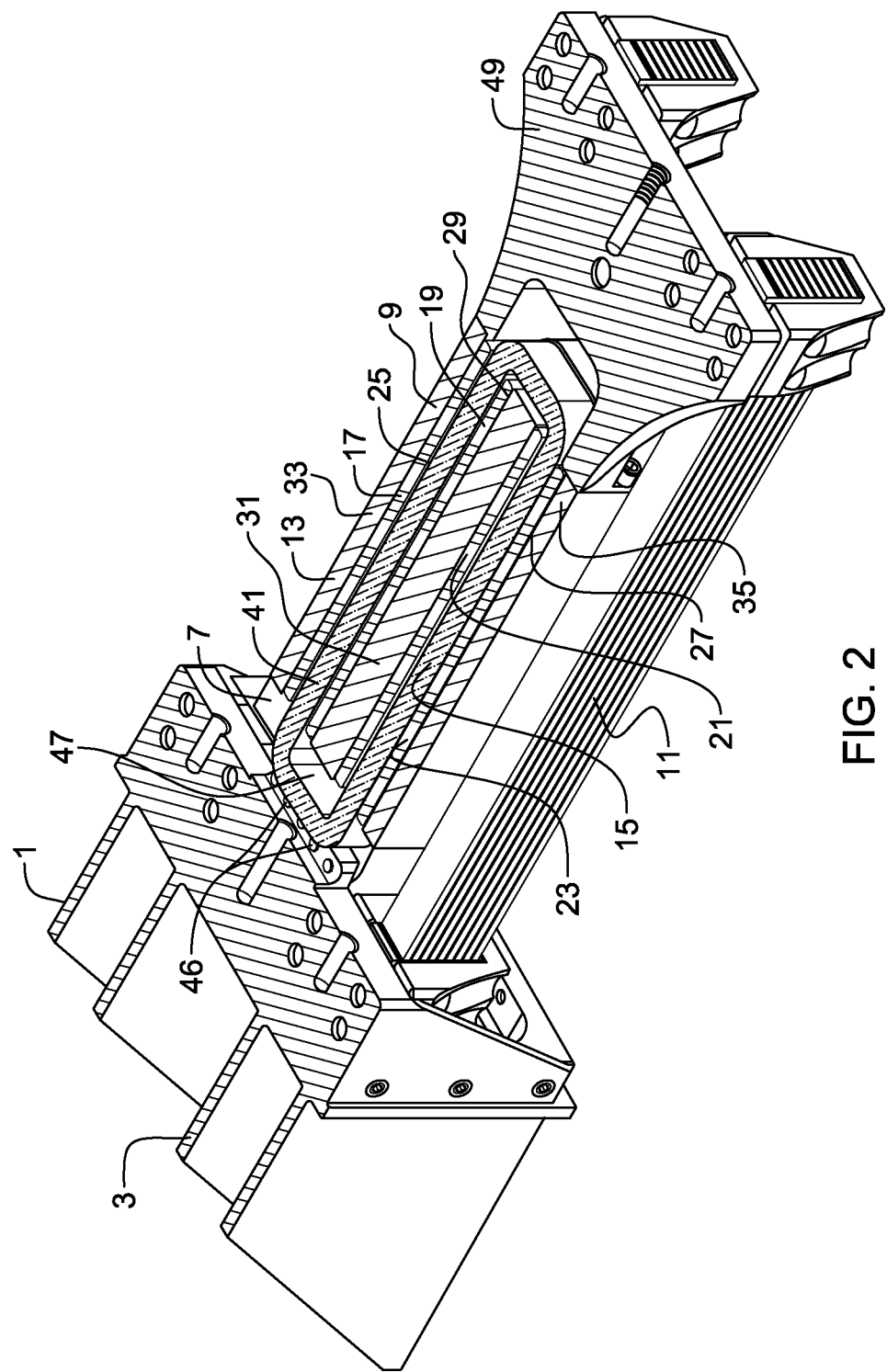
FIG. 2 is a perspective view of a bottom half of the electromagnetic inertial actuator shown in FIG. 1.
Figure 3:
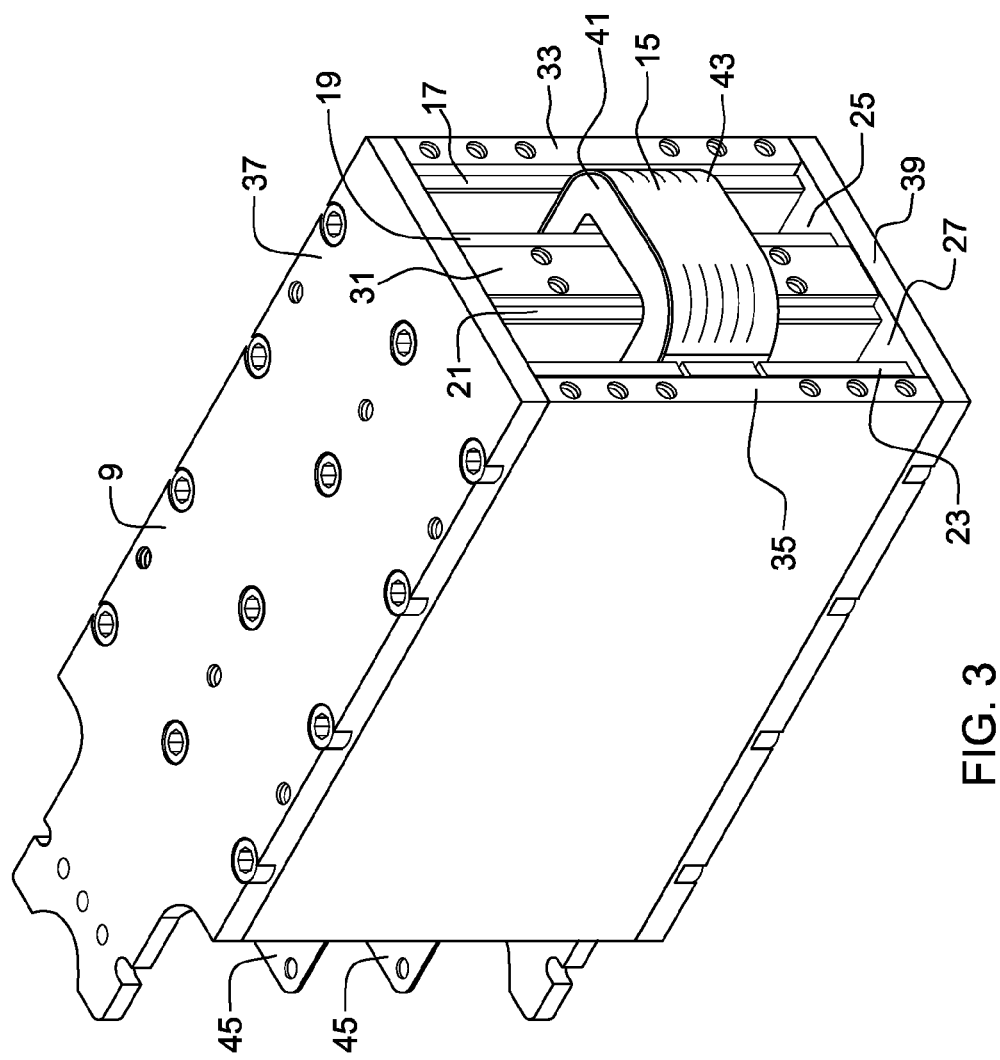
FIG. 3 is a perspective view of a flat voice coil motor.

FIG. 2 shows a cut through the electromagnetic inertial actuator 1, which allows a view of the interior of the voice coil motor part 9. In the embodiment shown in FIG. 2, the voice coil motor part 9 is a rectangular voice coil motor. The magnet part 13 includes permanent magnets 17, 19, 21, 23. Each of the permanent magnets 17, 19, 21, 23 is flat (planar) and has a rectangular cross-section. In the embodiment of FIG. 2, the magnet part 13 has four permanent magnets. In alternate embodiments, the magnet part 13 could have more or fewer permanent magnets (as will be shown below with reference to FIGS. 11A-11N). In general, the four magnets provide a good balance between weight and magnetic gauss field. The permanent magnets 17, 19, 21, 23 are in a parallel arrangement with each other and are spaced apart. Referring to FIG. 3, a gap 25 is defined between the adjacent permanent magnets 17, 19, and a gap 27 is defined between the adjacent permanent magnets 21, 23. A vertical plate 31 made of ferromagnetic material, such as low carbon steel, is disposed between the permanent magnets 19, 21. Vertical plates 33, 35 made of ferromagnetic material are also disposed adjacent to the permanent magnets 17, 23. In FIG. 3, horizontal plates 37, 39 made of ferromagnetic material are disposed adjacent to the tops and bottoms of the permanent magnets 17, 19, 21, 23. In FIG. 3, the ferromagnetic plates 31, 33, 35, 37, 39 are secured together, e.g., by means of bolts, to form an enclosure around the permanent magnets 17, 19, 21, 23 and thereby direct the magnetic flux path. In alternate embodiments, the ferromagnetic plates 31, 33, 35, 37, 39 could be integrated together, i.e., instead of being provided as separate pieces, into a unitary housing. In FIG. 3, the permanent magnets 17, 19, 21, 23 are held firmly in place, adjacent to the ferromagnetic plates 31, 33, 35, 37, 39, by friction. In alternate embodiments, the permanent magnets could be bonded to the ferromagnetic plates to thereby secure the permanent magnets in place.

Figure 4:
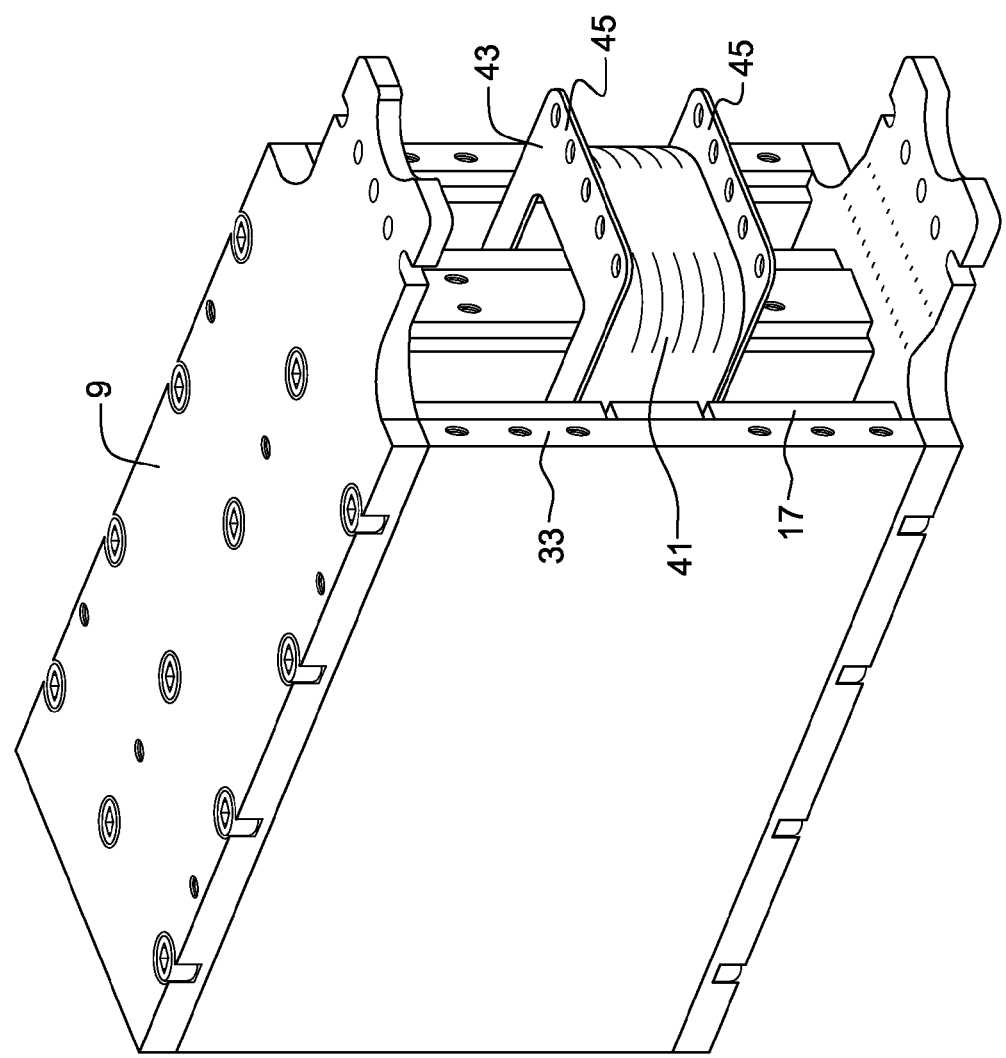
FIG. 4 is a rear view of the flat voice coil motor shown in FIG. 3.

Still referring to FIG. 3, the coil part 15 of the voice coil motor part 9 includes a coil 41 positioned in the gaps 25, 27. In the embodiment shown in FIG. 3, the coil 41 is wound on a bobbin 43. The coil 41 is wound in an oval or rectangular shape, as is best seen in FIG. 2. The coil 41 may be made of copper wire or other suitable conducting wire material. In FIG. 4, the bobbin 43 has flanges 45 with holes formed in them. The flanges 45 are used to attach the bobbin 43 to the support (3 in FIGS. 1 and 2). In FIG. 2, the bolts 46 indicate where the bobbin 43 is attached to the support base 3. Other techniques for attaching the bobbin 43 to the support base 3 besides bolts and flanges may be used. In general, the bobbin 43 should be attached to the support base 3 such that it is cantilevered from the support base 3 and in parallel arrangement with the flexure parts 7, 11. In alternate embodiments, the bobbin 43 may be omitted and the coil 41 may be wound into the desired shape without the aid of a bobbin. In this case, the coil 41 will be free to move in the gaps 25, 27. In FIG. 2, it should be noted that there is an adjustable gap 47 between the distal ends of the coil 43 and magnet part 13. The gap 47 allows the magnet part 13 to move curvilinearly relative to the support base 3, preferably tracing an arc from the combination of a vertical movement and an axial in-and-out movement. Preferably, the electromagnetic inertial actuator curvilinearly arcing moving mass is electromagnetically driven to move curvilinearly to trace out an arc. Also, in FIG. 2, a yoke (i.e., a frame that couples together) 49 is coupled to the magnet part 13. For example, such coupling could include bolting the yoke 49 to the ferromagnetic plates 33, 35. Other means of coupling the yoke 49 to the magnet part 13 could be used provided the integrity of the coupling remains intact as the magnet part 13 moves.

Figure 5:
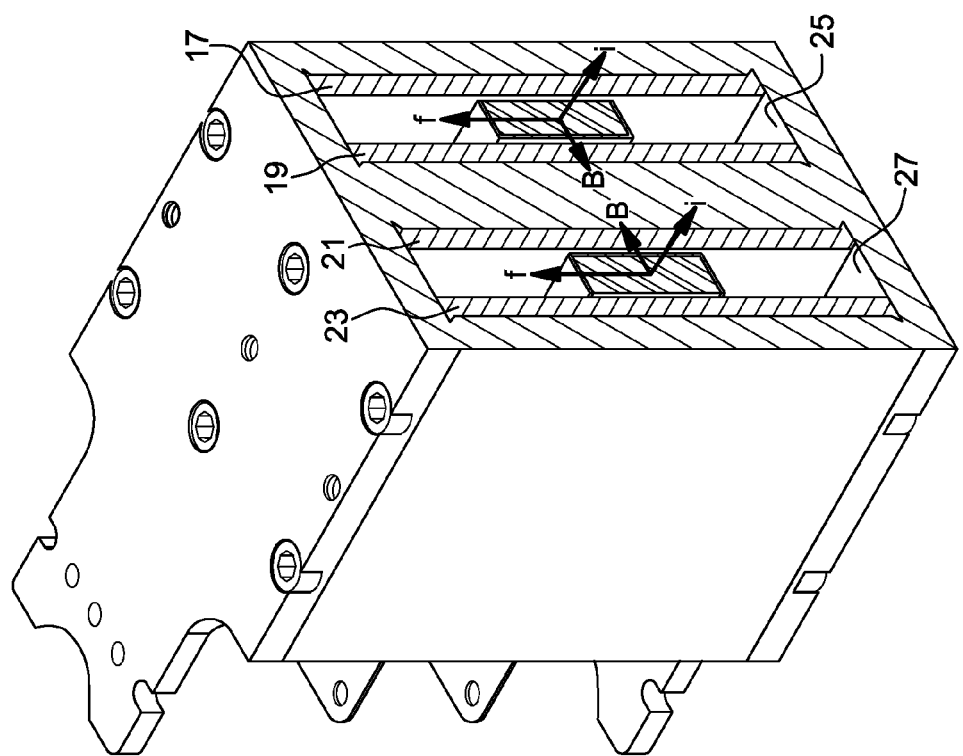
FIG. 5 is a perspective view of a left half of the flat voice coil motor shown in FIG. 3.
Figure 6:
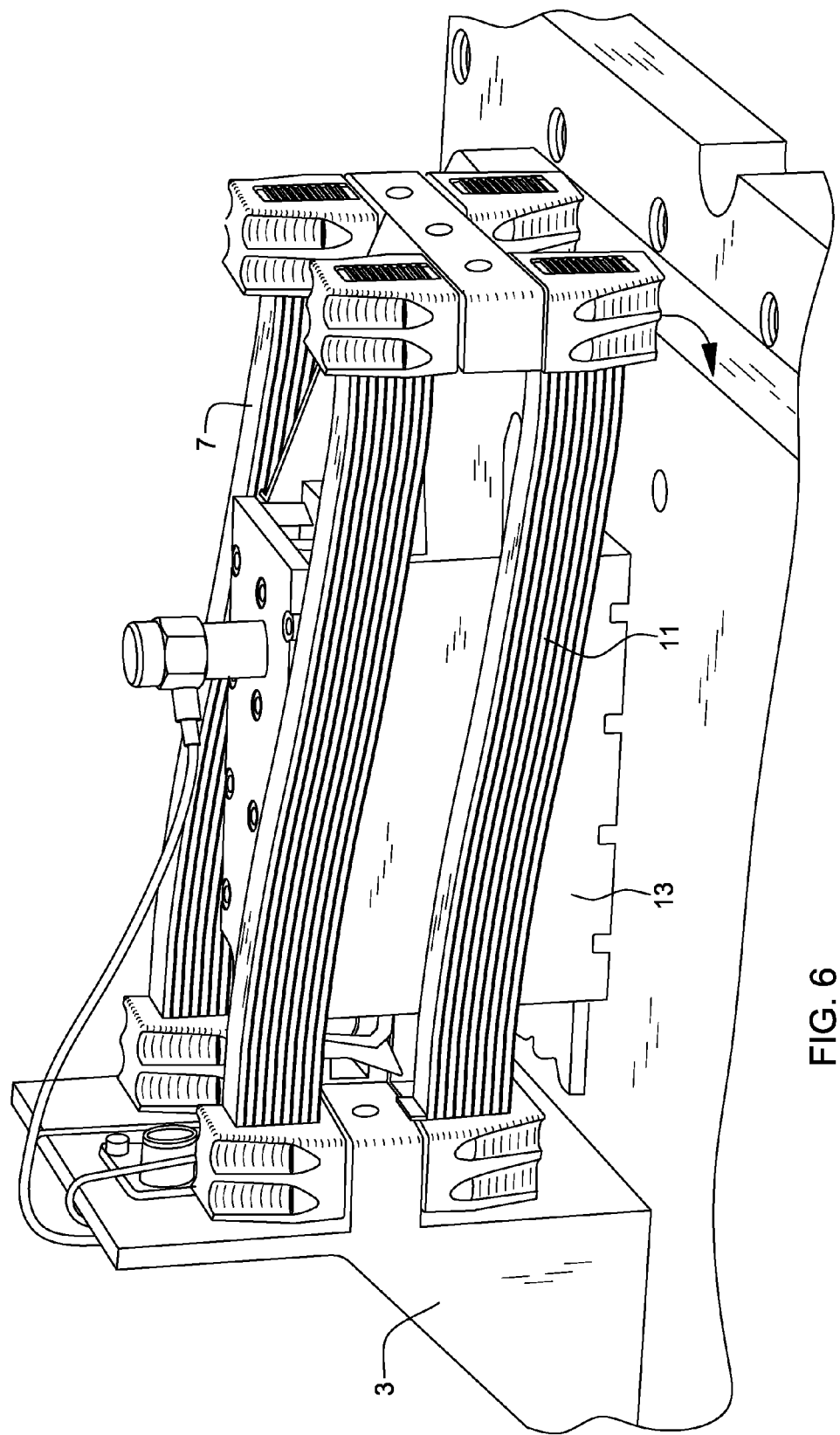
FIG. 6 shows the electromagnetic inertial actuator with the flat voice coil motor in a down position.
Figure 7:
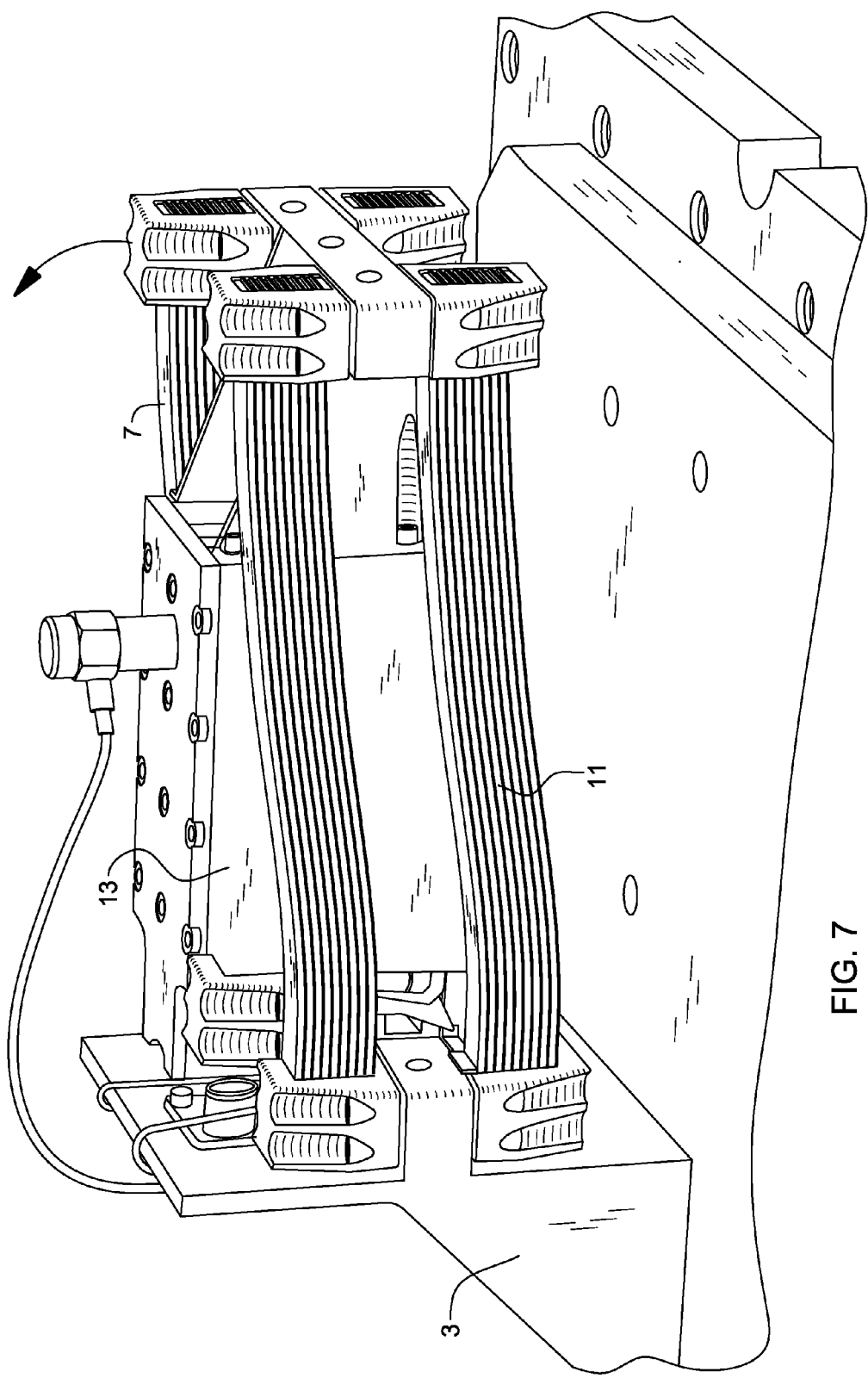
FIG. 7 shows the electromagnetic inertial actuator with the flat voice coil motor in an up position.
Figure 8:
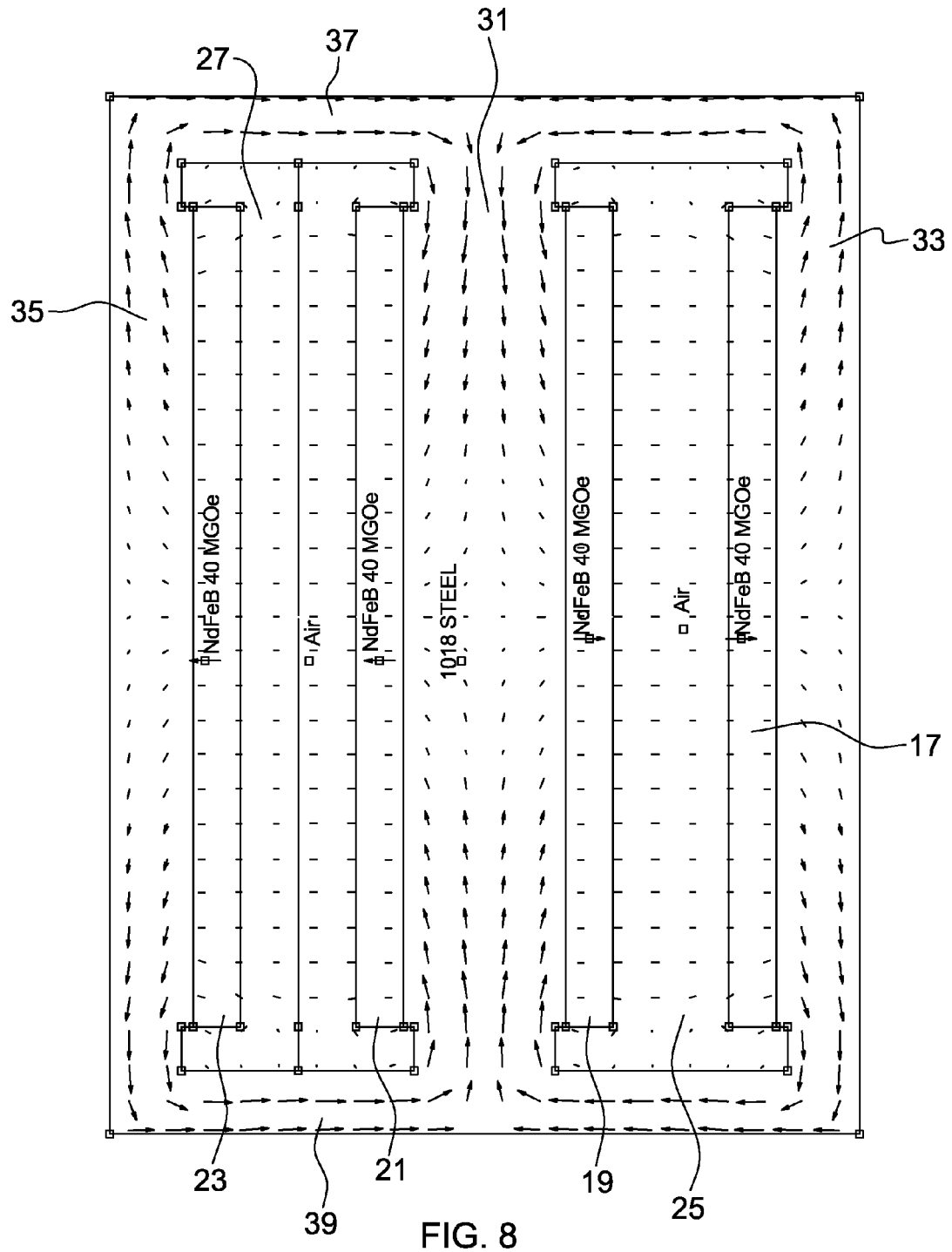
FIG. 8 shows magnetic flux in the flat voice coil motor.
Figure 9:
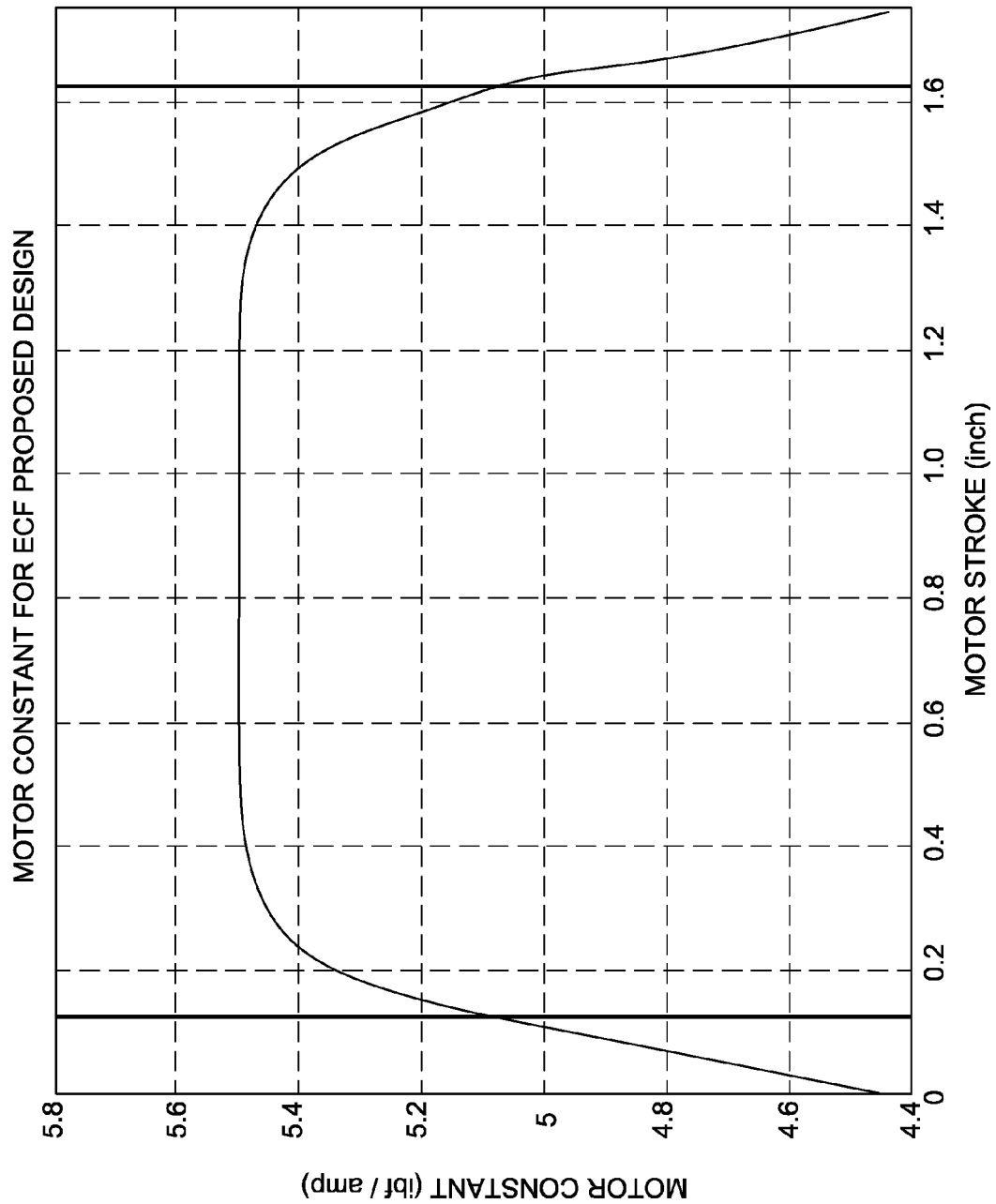
FIG. 9 is a plot showing force generated by the flat voice coil motor versus stroke of the motor.

FIG. 5 shows a cut through the voice coil motor part 9. In FIG. 5, B indicates the magnetic field created by the magnets 17, 19, 21, 23 in the gaps 25, 27. When alternating current i is supplied to the coil 41, the windings in the coil 41 interact with the magnetic field B in the gaps to exert a force f that drives (moves) the magnet part 13. Returning to FIG. 1, the flexure parts 7, 9 coupled to the magnet part 13 allow motion of the magnet part 13 along a vertical direction. Because of the cantilevered arrangement of the flexure parts 7, 9, the magnet part 13 moves in and out along an axial direction as it moves up and down along the vertical direction, thereby providing a curvilinear moving mass trace, preferably tracing an arc. FIG. 6 shows the magnet part 13 in a down position, with the flexure parts 7, 11 deflected downwardly. FIG. 7 shows the magnet part 13 in an up position, with the flexure parts 7, 11 deflected upwardly. The magnet part 13 moves in and out along the axial direction as it moves up and down along the vertical direction. As explained above, there is a gap (47 in FIG. 2) between the magnet part 13 and the coil (41 in FIG. 2) to accommodate axial motion of the magnet part 13 relative to the support base 3. FIG. 8 shows magnetic flux path in the ferromagnetic plates 31, 33, 35, 37, 39 when the windings in the coil 41 interact with the magnetic field created in the gaps 25, 27 by the permanent magnets 17, 19, 21, 23. FIG. 9 shows an example plot of force generated by the motor as a function of stroke of the motor. FIG. 9 shows that the force generated by the voice coil motor as described above is essentially linear, with very small force reduction at the ends of the stroke. In use, the force generated by the voice coil motor is transmitted to the support (3 in FIG. 1). If the support is attached to a structure, the force transmitted to the support can be used to counteract vibrations of the structure.

Figure 10:
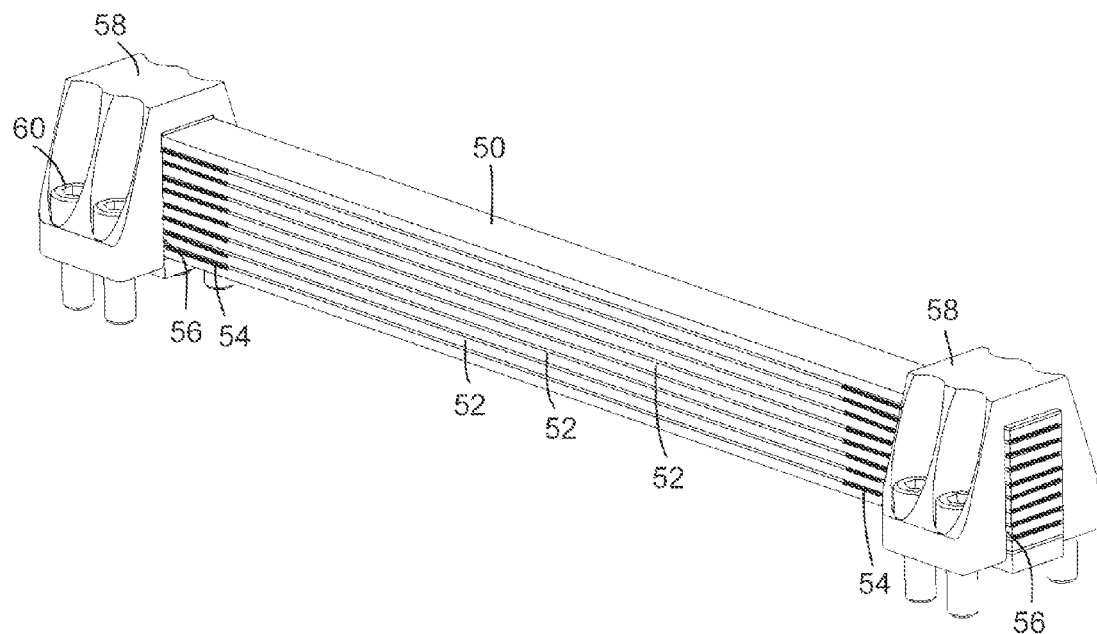
FIG. 10 is a perspective view of a flexure stack.

Returning to FIG. 1, each of the flexure parts 7, 11 is made up of two flexure stacks 50. In alternate embodiments, more or fewer flexure stacks may be included in each of the flexure parts 7, 11. FIG. 10 shows a flexure stack 50 according to one embodiment of the present invention. In the embodiment of FIG. 10, the flexure stack 50 includes flexures 52 interleaved with shims 54. In a preferred embodiment the shims 54 are proximate the ends of the flexures 52 and do not extend along the flexure length with the middle of the stacks 50 free of the shims 54 (relatively short shims preferably bonded proximate ends of flexures and clamps 58 and do not extend the full length of the flexures through the mid-region of the flexure). Each flexure 52 is in the form of a beam plate. The flexures 52 may be made of a non-elastomeric material, which may be metallic, non-metallic, or composite. Preferably, the flexures 52 are made of a composite or non-metallic material. In one embodiment, a composite material suitable for the flexures is comprised of reinforcing fibers in a polymer resin. In another embodiment, a composite material suitable for the flexures is comprised of a carbon-fiber reinforced composite. In another embodiment, the carbon-fiber reinforced composite is comprised of carbon fibers in a cured polymer matrix. In another embodiment, the carbon-reinforced fiber composite is comprised of carbon fibers in a cured epoxy matrix. The shims 54 could be made of metal or elastomer, with elastomer being preferred. In a preferred embodiment the elastomeric material for the shims is post-vulcanized rubber. The shims 54 in a preferred embodiment are bonded to the flexures 54 proximate their ends and the clamps 58, with the shims inhibiting a fretting of the flexures as they move with the stroke of the voice coil motor. Preferably the bonded elastomeric shims 54 are provided to inhibit a fretting of the flexures 54.

The distal ends of the flexure stack 50 are inserted into apertures 56 in flexure clamps 58 and held in the apertures 56, e.g., by friction. The flexure clamps 58 have a double row bolt arrangement 60 (i.e., two rows of bolts, with the rows positioned on opposite sides of the clamps), and with this arrangement the flexure stack 50 can be firmly attached to the bracket (49 in FIG. 1) and the vertical support (3 in FIG. 1). The double row bolt arrangement (60 in FIG. 10) improves the clamp stiffness and reduces the moment loads on the bolts (of the double row bolt arrangement) when the clamp 58 is secured to the bracket or vertical support. Returning to FIG. 1, the flexure stacks 50 span the full length of the inertial actuator 1, thereby allowing large strokes of the voice coil motor part 9. Large strokes result in large output forces of the actuator. The flexure stacks 50 are very stiff in five directions (lateral, longitudinal, and three rotations) but flexible in the vertical direction, allowing curvilinear movement of the magnet part 13 of the voice coil motor part 9. The cantilevered arrangement of the flexure parts 7, 11 and voice coil motor part 9 retains the parallel orientation of the voice coil motor part 9 relative to the flexure parts 7, 11 throughout the stroke of the voice coil motor part 9.

Figures 11A, 11B:
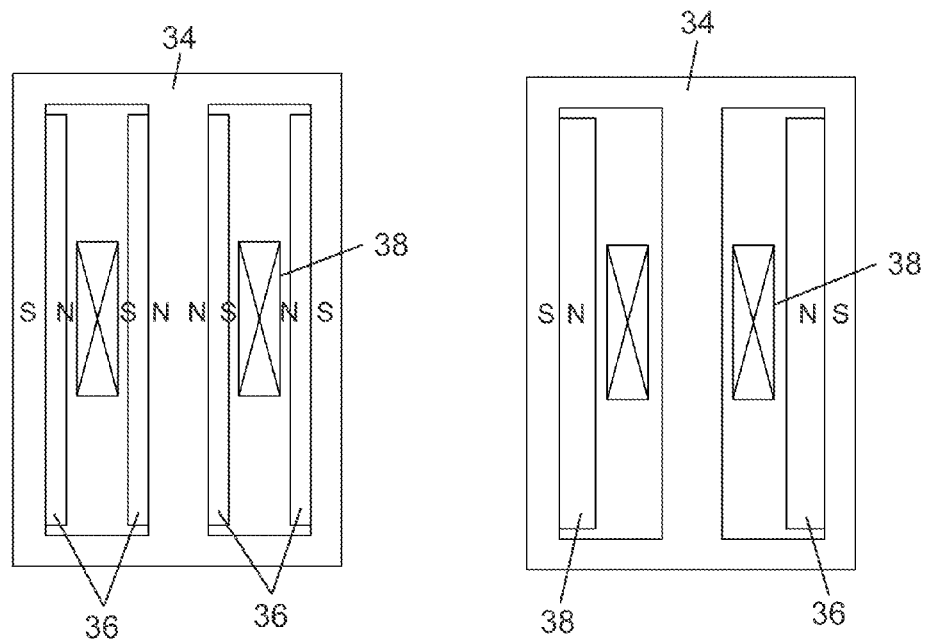
FIGS. 11A-11N show voice coil/magnet arrangements for a voice coil motor of an electromagnetic inertial actuator.
Figure 11C:
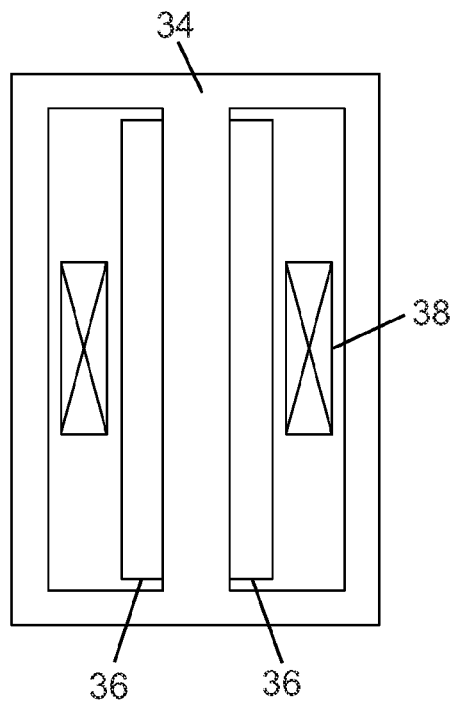
Figure 11D:
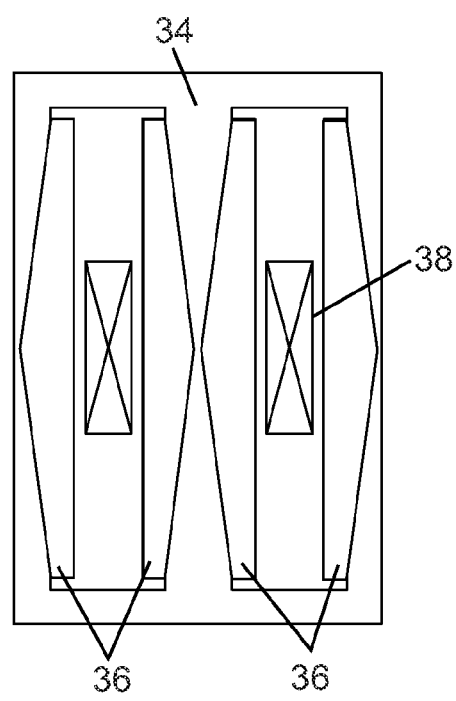
Figure 11E:
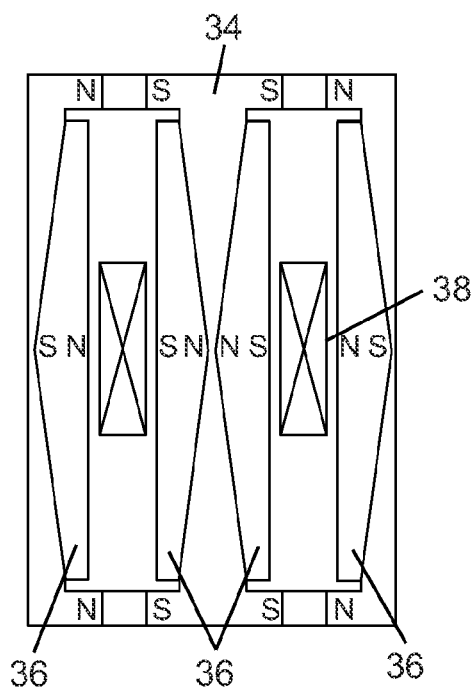
Figure 11F:
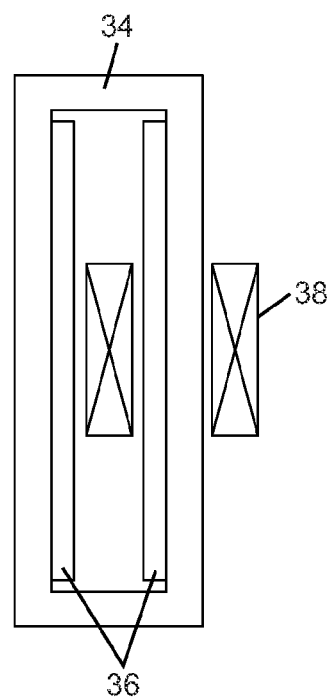
Figure 11G:
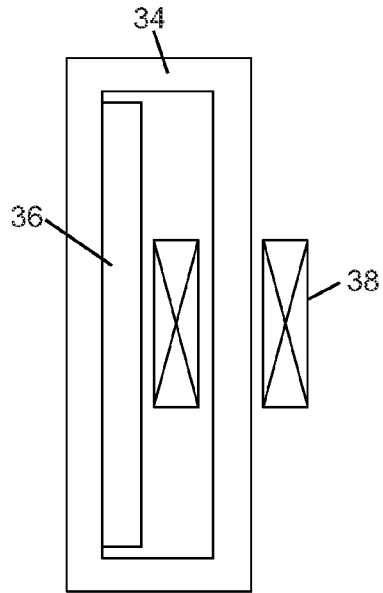
Figure 11H:
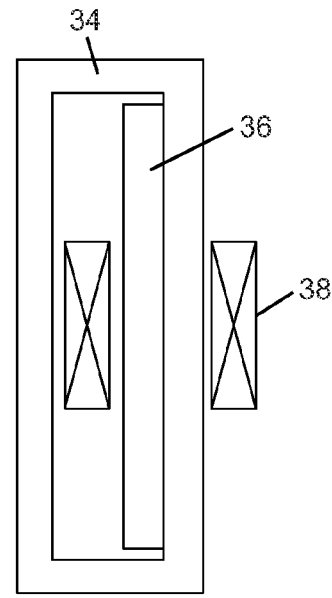
Figure 11K:
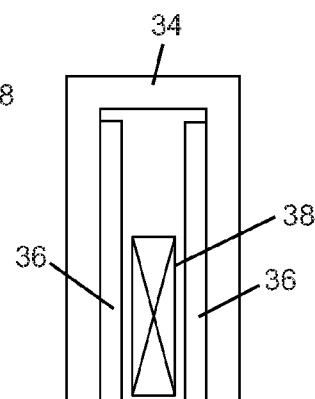
Figure 11K:
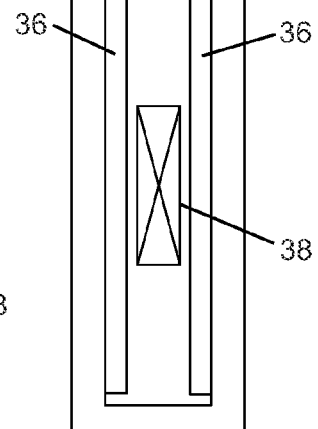
Figure 11I:
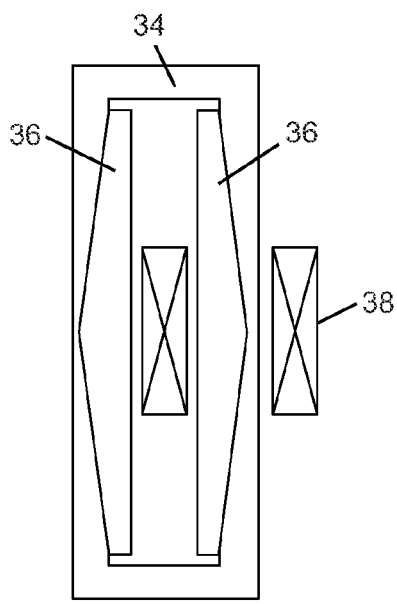
Figure 11J:
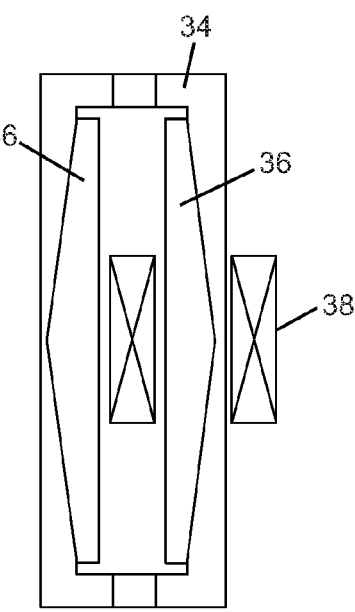

FIGS. 11A-11N show various examples voice coil/magnet arrangements usable in the voice coil motor part (9 in FIG. 1) of the electromagnetic inertial actuator (1 in FIG. 1). Each of these arrangements includes a ferromagnetic housing 34, or a plurality of ferromagnetic plates 34, defining a gap or a plurality of parallel gaps. Each of these arrangements further includes one or more permanent magnets 36 disposed in gap(s) and one or more coils 38 disposed adjacent to the permanent magnet(s) 36. The coils 38 are typically annular or rectangular in shape as described above. Multiple coils 38 may be used in a stacked arrangement, such as shown in FIGS. 11K-11N. The arrangement shown in FIG. 11A is similar to the one described above with reference to FIGS. 5 and 8.

FIG. 12 shows an aircraft 61 having a rotary wing system with at least one rotating blade rotating about a rotation axis. In use, the rotary wing system generates troublesome structural vibrations. A vibration control system for the aircraft 61 includes one or more vibration sensors 63 (e.g., accelerometers) mounted on the aircraft to sense the troublesome structural vibrations. The vibration control system also includes one or more electromagnetic inertial actuators 1 cantilever-mounted on the aircraft 61. The vibration control system also includes a controller 65. The controller 65 is shown outside of the aircraft for illustration purposes only. In practice, the controller 65 would be on-board the aircraft. The controller 65 receives signals from the vibration sensor(s) 63 representative of the troublesome structural vibrations. The controller 65 then sends signals to the electromagnetic inertial actuators 1, instructing the electromagnetic inertial actuator(s) 1 to generate a force that counteracts the troublesome structural vibrations. Preferably the controller drives a plurality of electromagnetic inertial actuators with the actuators' sprung moving mass magnet part 13 tracing curvilinear arcs relative to their support bases, the support bases being physically grounded to the aircraft structure. Preferably the actuators' sprung moving mass magnet part 13 are cantilevered sprung supported with the composite flexures with the bonded elastomer end fret inhibiting shims.

Figure 13:
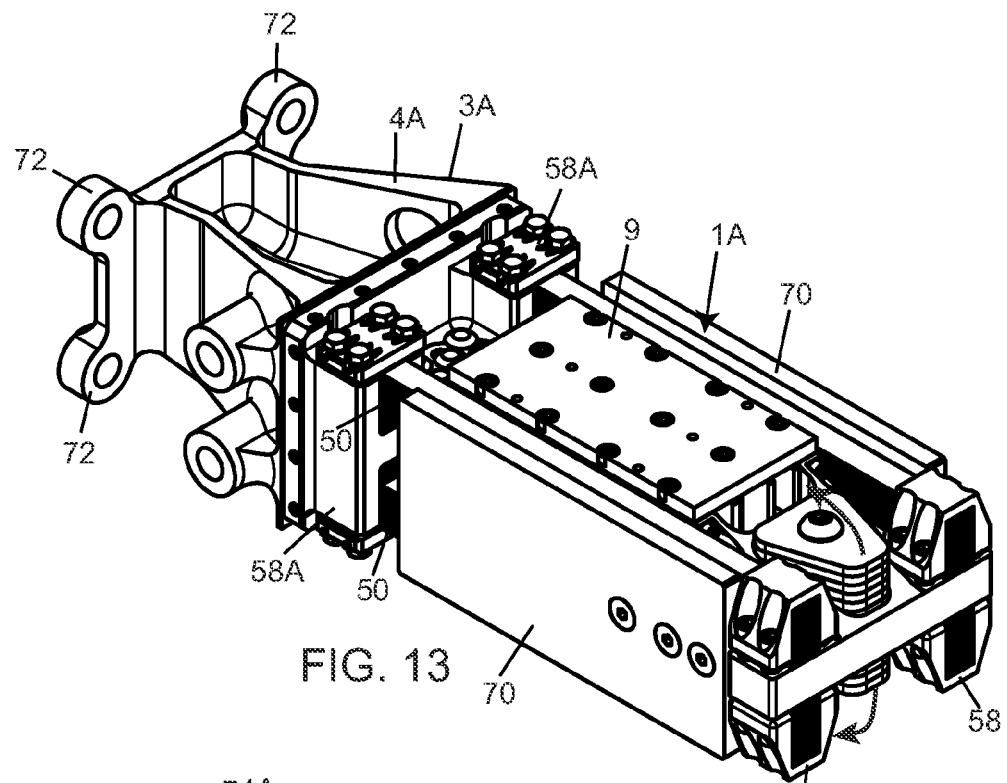
FIG. 13 is a perspective view of a variant of the electromagnetic inertial actuator shown in FIG. 1.

FIG. 13 shows a variant 1A of the electromagnetic inertial actuator 1 of FIG. 1. In FIG. 13, weights 70, e.g., made of a metal such as steel, are coupled to the voice coil motor part 9. The weights 70 add mass to the sprung moving mass. Mounting base 4A of the support base 3A shown in FIG. 13 is different from the mounting base 4 shown in FIG. 1. The base 4A of FIG. 13 has ears or flanges 72 that allows mounting of the base 4A to a structure through a side of the base 4A. (In comparison, the base 4 of FIG. 1 can be mounted to a structure through a bottom of the base.) In FIG. 13, the flexure clamps 58A at the support base 3A are different from the flexure clamps 58 at the support base 3 shown in FIG. 1. Each of the flexure clamps 58A shown in FIG. 13 can receive ends of multiple flexure stacks. The flexure clamps 58 shown in FIG. 1 can only receive one end of a single flexure stack.

Figure 14:
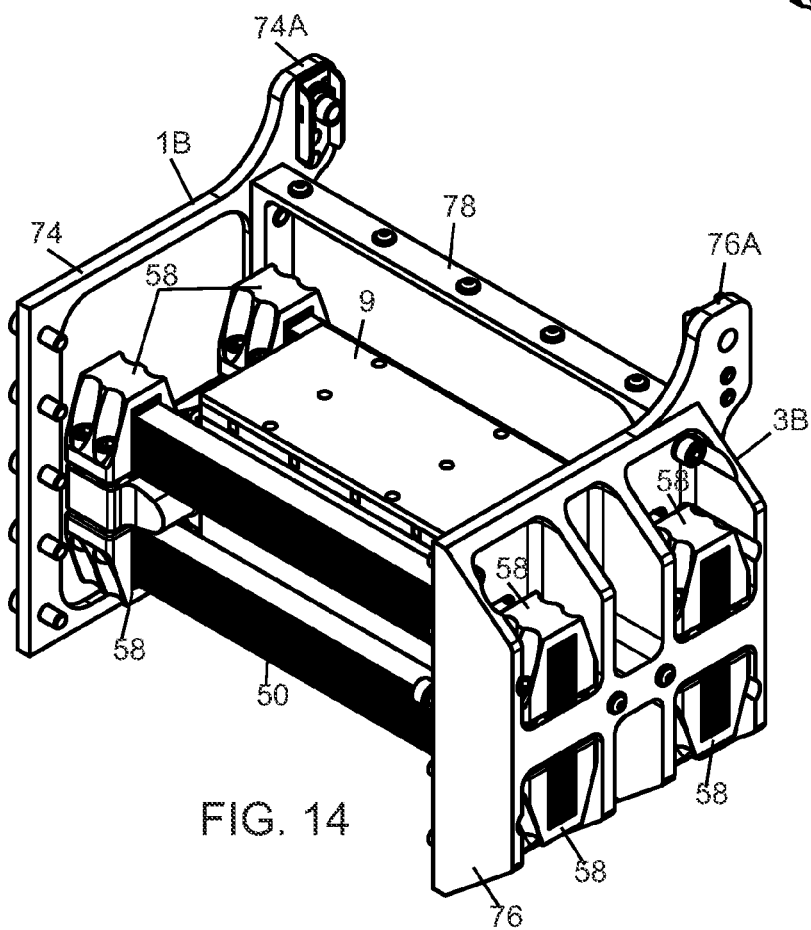
FIG. 14 is a perspective view of a variant of the electromagnetic inertial actuator shown in FIG. 1.

FIG. 14 shows a variant 1B of the electromagnetic inertial actuator 1 of FIG. 1. The variant 1B differs from the embodiment shown in FIG. 1 primarily in terms of the support base. In FIG. 14, the support base 3B includes parallel plates 74, 76. The flexure stacks 50 at one end are coupled to the parallel plate 76, via attachment of the flexure clamps 58 to the parallel plate 76. The flexure stacks 50 at the other end are free to move and are not coupled to the parallel plate 74. The parallel plates 74, 76 are attached to a frame 78, thereby ensuring the rigidity of the support base 3B. The parallel plates 74, 76 include ears or flanges 74A, 76A that can be connected to a structure. The support base 3B allows the electromagnetic inertial actuator 1B to be mounted sideways to a structure. The cantilevered parallel arrangement of the flexure stacks 50 and voice coil motor 9 is maintained by fixing the arrangement to only one of the parallel plates, i.e., parallel plate 76.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An electromagnetic inertial actuator (1) in electronic communication with a controller (65), comprising:
   a support base (3);
   a parallel arrangement of a first flexure part (7), a voice coil motor part (9), and a second flexure part (11), the parallel arrangement being cantilevered from the support base (3), the first flexure part (7) and the second flexure part (11) each comprise an upper and lower flexure part (7, 11), wherein the first upper and lower flexure parts (7) are each comprised of a first flexure stack (50) and the second upper and lower flexure parts (11) are each comprised of a second flexure stack (50);
   a first clamp (58) engaged with the first end (8) of the first flexure stack (50) and a second clamp (58) engaged with the first end (12) of the second flexure stack (50), each of the first clamp (58) and the second clamp (58) being attached to the support base (3) at a plurality of points, thereby coupling first ends (8, 12) of the first and second flexure parts (7, 11) to the support base (3);
   a third clamp (58) engaged with a second end (10) of the first flexure stack (50) and a fourth clamp (58) engaged with the second end (14) of the second flexure stack (50), each of the third clamp (58) and the fourth clamp (58) being attached to a yoke (39) at a plurality of points, thereby coupling the second ends (10, 14) of the first and second flexure stacks (50) to the yoke (13);
   a yoke (49) coupled to a magnet part (13) and to the second end (10) of the first flexure stack (50) and a second end (14) of the second flexure stack (50), thereby coupling second ends (10, 14) of the of the flexure parts (50) to the magnet part (13);
   wherein the voice coil motor part (9) comprises the magnet part (13) and a coil part (15), the magnet part (13) comprising a plurality of permanent magnets (17, 19, 21, 23), the coil part comprising a coil (41);
   wherein each of the upper and lower flexure parts (7, 11) has opposing first (8, 12) and second ends (10, 14), the first ends (8, 12) being coupled to the support base (3), the second ends (10, 14) being coupled to the magnet part (13);
   wherein the magnet part (13) further comprises ferromagnetic material (31, 33, 35, 37, 39) disposed adjacent to each of the permanent magnets (17, 19, 21, 23);
   wherein the permanent magnets (17, 19, 21, 23) define at least one gap (25, 27) for receiving the coil (41);
   wherein distal ends of the magnet part (13) and coil (41) define an adjustable gap (47) to accommodate arc motion of the parallel arrangement relative to the support base (3) when the electromagnetic inertial actuator (1) is driven; and
   wherein the controller (65) is configured to communicate an electronic signal to the electromagnetic inertial actuator (1) and thereby drive the voice coil (9) magnet part (13) to move relative to base (3) and create a vibration.

2. The electromagnetic inertial actuators of claim 1, wherein each of the permanent magnets is flat.

3. The electromagnetic inertial actuator of claim 1, wherein each of the permanent magnets has a rectangular or triangular cross-section.

4. The electromagnetic inertial actuator of claim 1, wherein the permanent magnets define two parallel gaps for receiving the coil.

5. The electromagnetic inertial actuator of claim 1, wherein the first flexure part comprises a plurality of first flexure stacks and the second flexure part comprises a plurality of second flexure stacks with said yoke in between said first flexure stacks and in between said second flexure stacks.

6. The electromagnetic inertial actuator of claim 1, wherein each of the first flexure stack and second flexure stack comprises a plurality of flexures interleaved with a plurality of shims.

7. The electromagnetic inertial actuator of claim 6, wherein the flexures are composite flexures and the bonded elastomeric end shims are configured to inhibit fretting.

8. The electromagnetic inertial actuator of claim 1, wherein the coil is physically grounded to the support base.

* * * * *